United States Patent [19]

Kuehne et al.

[11] 3,873,544
[45] Mar. 25, 1975

[54] CYANOALKYLAMINO-S-TRIAZINES
[75] Inventors: Manfred Kuehne, Pfeffingen; Christian Vogel, Binningen, both of Switzerland
[73] Assignee: Ciba-Geigy Corporation, Ardsley, N.Y.
[22] Filed: Aug. 1, 1972
[21] Appl. No.: 276,995

[30] Foreign Application Priority Data
Aug. 5, 1971  Switzerland................ 11526/71

[52] U.S. Cl.............. 260/249.8, 71/93, 260/249.6
[51] Int. Cl........................................ C07d 55/20
[58] Field of Search................... 260/249.8

[56] References Cited
UNITED STATES PATENTS
3,505,325  4/1970  Schwarze.................. 260/249.8
3,629,258  12/1971  Berrer et al................ 260/249.8
3,629,259  12/1971  Schwarze.................. 260/249.8
3,705,156  12/1972  Petree........................ 260/249.8

Primary Examiner—John M. Ford
Attorney, Agent, or Firm—Harry Falber; Frederick H. Rabin

[57]  ABSTRACT

Bis-(substituted alkylamino)-s-triazines in which one alkyl moiety is substituted by cyano and is interrupted by oxygen or sulphur are preferred weed-killers in crops of cultivated plants such as cotton, maize, sorghum or soya.

4 Claims, No Drawings

CYANOALKYLAMINO-S-TRIAZINES

The present invention relates to new s-triazine derivatives, to processes for their production, to the application of the new triazines for the control of weeds and of wild grasses, also to agents for the control of such weeds, and to processes for the control of weeds and of wild grasses by application of the new s-triazine derivatives or of agents containing them.

Already an appreciable number of triazines have become known as herbical active substances which can be applied, by virtue of their pronounced herbicidal activity, for the control of weeds in crops of the most diverse kind. Thus, for example, several representative compounds from the series of 2-chloro-, 2-methoxy- and 2-methylthio-4,6-bis(subt. alkylamino)-s-triazines have assumed great importance for the selective control of weeds in grain, maize and fodder crops. Triazine derivatives having cyanoalkylamino and cyclopropylamino groups have also become known in recent times (e.g. U.S. Pat. No. 3,451,802, French Pat. No. 1,536,479 and Belgian Pat. No. 730,135), which, with regard to action and selectivity in various crops of cultivated plants, show certain advantages, but which, with respect to selectivity in the case of certain cultivated plants, are not fully satisfactory, or which have undesirable deficiencies in their sphere of action against weeds associated with these cultivated plants. This is particularly so in the case of grain varieties, rice, soya bean, sorghum, cotton, etc., and weeds frequently occurring in these cultivated crops.

The aim of the work on which the present invention is based was therefore the development of herbicidal active substances which have a good and, as far as possible, complete herbicidal action against the weed flora growing amongst various cultivated plants, whilst preserving the cultivated plants concerned to the maximum extent.

It has now been found that triazine derivatives of formula I

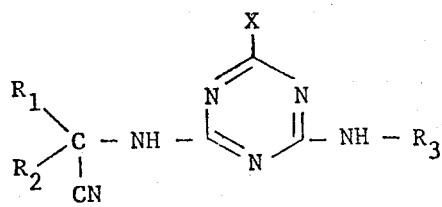

wherein
  X represents halogen, an alkylthio radical, or the azido group, and
  $R_1$ represents an alkyl radical substituted by alkoxy, by alkylthio or by cyano, or wherein $R_1$ can also represent a cyclopropyl radical in the case where $R_3$ denotes an alkyl radical substituted by alkoxy,
  $R_2$ represents hydrogen or an alkyl radical, or the symbols $R_1$ and $R_2$ together are a polymethylene bridge member optionally interrupted by oxygen, and
  $R_3$ represents hydrogen, an alkyl radical, or an alkyl radical substituted by alkoxy, or a cycloalkyl radical.

By alkyl radicals $R_1$, $R_2$ and $R_3$ in formula I are meant lower radicals having 1 to 6 carbon atoms in a straight or branched chain, i.e. methyl, ethyl, n-propyl, isopropyl, n-butyl, isobutyl, sec.butyl, tert.butyl, as well as n-pentyl and n-hexyl with their isomers. As substituents of an alkyl radical, alkoxy and alkylthio radicals contain, corresponding to the meaning of $R_1$, 1 or 2 carbon atoms in the alkyl moiety. The polymethylene bridge member represented by $R_1$ and $R_2$ together, the chain of which can be interrupted by oxygen, stands preferably for the 3-oxabutylene chain, by which, together with the C-atom being carried by the symbols $R_1$ and $R_2$, the tetrahydrofuran radical is formed. Cycloalkyl radicals, denoted by $R_1$ and $R_3$, can contain 3 to 6 ring members; cyclopropyl is preferred. By halogen is meant fluorine, chlorine, bromine or iodine, preferably chlorine.

Because of their particular herbicidal action, s-triazine derivatives of the restricted formula I a are of special importance:

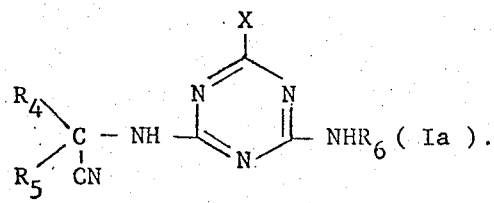

The symbols in this formula have the following meanings:
  X represents chlorine or a methylthio radical,
  $R_4$ represents an alkyl radical substituted by alkoxy or alkylthio, or a cyclopropyl radical if $R_3$ denotes an ethyl radical substituted by ethoxy or methoxy,
  $R_5$ represents hydrogen or methyl,
  $R_6$ represents hydrogen, or an ethyl radical optionally substituted by ethoxy or methoxy.

The following are preferred: 2-chloro-4-(1'-cyano-1'-methyl-2'-methoxy-ethylamino)-6-amino-s-triazine, -6-ethylamino-s-triazine and -6-isopropylamino-s-triazine, as well as 2-methylthio-4-(1'-cyano-1'-methyl-2'-methoxy-ethylamino)-6-ethylamino-s-triazine, 2-methylthio-4-(1'-cyano-1'-methyl-3'-methoxy-n-propylamino-)-6-ethlyamino-s-triazine and 2-methylthio-4-(1'-cyano-1'-cyclopropyl-ethylamino)-6-(2'',2''-diethoxy-ethylamino)-s-triazine.

The new s-triazine derivatives of formula I are produced according to the invention by the reaction of an aminonitrile of formula II

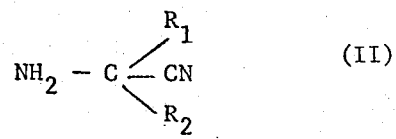

wherein $R_1$ and $R_2$ have the meanings given under formula I, preferably however of a salt of such an aminonitrile, with cyanuric chloride in a solvent or diluent, and in the presence of an acid-binding agent at temperatures of below 30°C; the reaction then of the formed intermediate of formula III

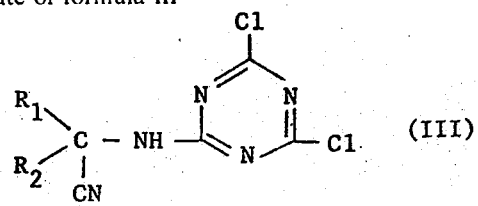

with an amine of the formula $R_3 - NH_2$, in the presence of an acid-binding agent and of a solvent or diluent at a temperature of between 10° and 50°C; and, optionally, the replacement of the remaining last chlorine atom, in a manner known per se, by an alkoxy, alkylthio or azido group.

For the production of triazine derivatives of formula I wherein X represents an alkylthio radical, it is also possible to commence with corresponding 2,4-dichloro-6-alkylthio-s-triazines; to react these with aminonitriles of formula II, or with salts thereof, in the presence of an acid-binding agent, to give 2-chloro-4-alkylthio-6-[1'-cyano-alkylamino]-s-triazines; and to produce therefrom with a primary alkylamine of the formula $R_2NH_2$, in the presence of an acid-binding agent, alkylthio-s-triazine derivatives according to the invention. In principle, the sequence of introduction of the substituents into the triazine ring may be chosen as desired.

The replacement of the chlorine atom in a 2-chloro-4-amino-6-[1'-cyano-alkylamino]-s-triazine by the alkylthio radical is effected by a process in which aqueous trimethylamine solution is added to a suspension of the corresponding 2-chlorotriazine in a diluent, e.g. in acetone/water, and the whole stirred until a clear solution is obtained; the double molar amount of the corresponding mercaptan is thereupon introduced, the whole stirred at room temperature, and the formed oil then processed. The replacement of the chlorine atom can also be accomplished by the introduction of the corresponding 2-chloro-4-[1'-cyano-alkylamino]-s-triazine into an alcoholic or alcoholic-aqueous solution of an alkali metal mercaptide, and the refluxing of the thus formed mixture until it shows a neutral reaction.

The aminonitriles of formula II and their salts used as starting materials are in some cases new compounds not hitherto described in the literature. They are produced, for example, by the method of Strecker wherein a known ketone of formula V (French Pat. No. 1,239,959; U.S. Pat. No. 3,122,587; Angew. Chemie 80, page 578; Bulletin Soc. chim. France 1962, page 1634)

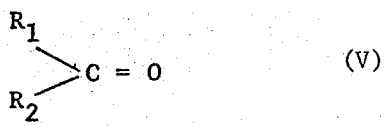

in which $R_1$ and $R_2$ have the meanings given under formula I is treated in ether with ammonium chloride and aqueous sodium cyanide solution. In the processing of the ether extracts, it is preferably the hydrochloride of the obtained aminonitrile of formula II which is precipitated immediately by the introduction of HCl gas.

Suitable solvents or diluents for the reaction of the aminonitrile of formula II or of a salt, especially the hydrochloride, with cyanuric chloride, or with a 2,4-dichloroamino-s-triazine of formula IV, are water, aliphatic and aromatic hydrocarbons and halogenated hydrocarbons, ethers and ethereal compounds, nitriles, amides, ketones, etc., as well as mixtures of such solvents with each other and with water, preferably toluene/water mixtures.

The same applies for the reaction of the intermediate of formula III with an amine of the formula $R_3$-$NH_2$, and for the reaction of a 2,4-dichloro-6-alkylthio-s-triazine with a nitrile of formula II and with an amine of the formula $R_3$-$NH_2$.

Applicable as acid-binding agents for these reactions are either inorganic bases such as alkali metal hydroxides or carbonates or alkaline earth metal hydroxides or carbonates, or tertiary amines such as trialkylamines, pyridine and pyridine bases. Inorganic bases such as NaOH are preferred.

The reactions of the aminonitrile of formula II with cyanuric chloride are performed in the temperature range of −30° to +30°C, and the duration of the reaction varies, depending on the chosen temperature, from a few minutes to 10 hours. The reaction of the intermediate of formula III with the amine of the formula $R_3$-$NH_2$ is carried out at temperatures of from 10° to 50°C, and the duration can be up to 3 days.

If the aminonitrile of formula II is reacted with a dichloro-subst.amino-s-triazine of formula IV, then the reaction time is from a few minutes to ten hours at temperatures of from 0° to 40°C.

The azido group can be introduced by reaction with an alkali metal azide in the presence of a basic substance. Suitable basic substances are preferably tertiary amines such as trialkylamines, also hydroxides, oxides and carbonates of alkali metals and alkaline-earth metals. Water is preferably used as solvent or diluent for the reaction; other solvents can however also be used, such as, for example, the above mentioned solvents.

The process according to the invention for the production of the new active substances of formula I is illustrated by the following examples. The term 'parts' denotes parts by weight and temperatures are expressed in degrees Centigrade.

EXAMPLE 1

An amount of 312 g (=1.69 moles) of cyanuric chloride is dissolved in 2000 ml of toluene, and, with stirring, a solution of 267 g (=1.69 moles) of 1,1-dimethoxy-3-amino-3-cyano-butane in 500 ml of toluene added dropwise at −10° to −5°. An addition is then made dropwise, at the same temperature, of a solution of 67.5 g (=1.69 moles) of sodium hydroxide in 400 ml of water. The mixture is further stirred until it shows a neutral reaction. The temperature is allowed to rise to +20°, and a solution of 76.2 g (=1.69 moles) in 500 ml of water added dropwise at room temperature. Stirring is continued until the mixture again shows a neutral reaction. The aqueous phase is then separated from the toluene phase, and washed with ca. 300 ml of toluene. The combined toluene phases are dried over sodium sulphate and concentrated by evaporation to dryness. The mainly oily residue solidifies after addition of petroleum ether, and can be recrystallised from hexane/benzene to thus obtain 2-chloro-4-ethylamino-6-[1'-cyano-1'-methyl-3',3'-dimethoxy-n-propylamino]-s-triazine, M.P. 119°–122°C; [=compound 1].

EXAMPLE 2

An amount of 6.3 g (=0.02 mole) of 2-chloro-4-ethylamino-6-[1'-cyano-1'-(2'',2''-dimethoxy)-etthylamino]-s-triazine is suspended in 100 ml of a mixture of equal parts of acetone and water. An addition is then made all at once at room temperature of 3.0 g (=0.022 mole) of 40 percent aqueous trimethylamine solution. The mixture is stirred at room temperature until a clear solution is obtained. An amount of 1.9 g (=0.04 mole) of methylmercaptan is then introduced, likewise at room temperature. Stirring is continued for 24 hours and the precipitated oil afterwards separated. The aqueous layer is saturated with NaCl and extracted with ether. The combined ether extracts, together with the oil previously separated from the reaction mixture, are dried and concentrated by evaporation. A little petroleum ether is added to the oil remaining behind, and the whole cooled to ca. −10°, whereupon a crystal mass is formed. The crystals are filtered off under suction and dried, the obtained product being 2-methylthio-4-ethylamino-6-[1'-methyl-1'-cyano-3',3'-dimethoxy-propylamino]-s-triazine, M.P. 92° – 94°C; [=compound 2].

EXAMPLE 3

An amount of 31.4 g of 2-chloro-4-ethylamino-6-[1'-cyano-1'-methyl-3',3'-dimethoxy-n-propylamino]-s-triazine is dissolved in 500 ml of acetone; an addition is made to this solution of 11.7 g of a 40 percent aqueous solution of trimethylamine (corresponding to 5.9 g of 100 percent trimethylamine). This solution is held at room temperature until, on addition of water, no further precipitate is formed. An amount of 6.5 g of NaN$_3$, dissolved in 50 ml of water, is then added. The solution is stirred overnight at room temperature, and 1 litre of water afterwards added, whereupon the product precipitates initially in a resinous form. It can be crystallized, however, with the aid of ether and petroleum ether, and then recrystallized from a mixture of petroleum ether and ether. Pure 2-azido-4-ethylamino-6-[1'-cyano-1'-methyl-3',3'-dimethoxy-n-propylamino]-s-triazine, M.P. 91°–93°C, is obtained in this manner; [=compound 3].

EXAMPLE 4

An amount of 8.9 g (=0.048 mole) of cyanuric chloride is dissolved in 100 ml of toluene; an addition is then made dropwise at −20°, with stirring, of 6.25 g (=0.048 mole) of 1-cyano-3-methylthiopropylamine [produced according to J.A.C.S. 70, 1450 (1958)], dissolved in 10 ml of toluene. Likewise at −20°, an addition is afterwards made dropwise of 1.9 g (=0.048 mole) of sodium hydroxide dissolved in 50 ml of water, and the mixture stirred until it shows a neutral reaction. An amount of 8.5 g (=0.096 mole) of 51% aqueous ethylamine (diluted with 20 ml of water) is then added dropwise, with stirring, at +10°. Stirring is continued at room temperature until the mixture shows a neutral reaction. The precipitate is thereupon filtered off under suction, washed with water and dried. It consists of 2-chloro-4-ethylamino-6-(1'-cyano-3'-methylthio-propylamino)-s-triazine, M.P. 78° – 82°C; [compound 4].

EXAMPLE 5

A mixture of 250 ml of acetone and 250 ml of water with 185 g of cyanuric chloride is cooled to −10°; a solution of 158 g of 1,1-dimethoxy-3-amino-3-cyanobutane in 100 ml of acetone is then added dropwise at −10° to −5°. An addition is made likewise dropwise and at the same temperature of 250 ml of a 4N sodium hydroxide solution, and the mixture stirred until it shows a neutral reaction. An amount of 48 g of methylmercaptan is then introduced at 0° to +5°, and subsequently, at the same temperature, 250 ml of 4N sodium hydroxide solution added dropwise. Stirring is then continued again at 0° to +5° until a further neutral reaction is shown. Finally, an addition is made, without cooling, of 88 ml of a 51 percent aqueous ethylamine solution, and the mixture refluxed until it once again produced a neutral reaction. The acetone is evaporated off in vacuo, the precipitating oil separated, and the aqueous phase washed with ether. The ether extract, together with the previously separated oil, is dried with sodium sulphate, and the solvent filtered off in vacuo. Some petroleum ether is added to the yellowish oil remaining behind. On cooling, 2-methylthio-4-ethylamino-6-[1'-cyano-1'-methyl-3',3'-dimethoxy-propylamino]-s-triazine crystallises out. It is filtered off under suction and dried, M.P. 92°-94°C. Also the s-triazine derivatives of formula I:

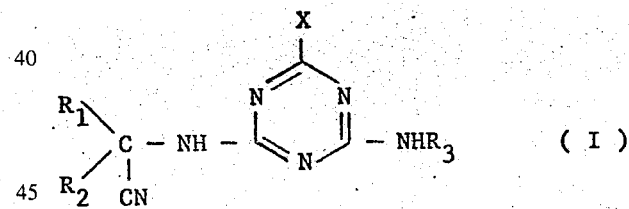

which are listed in the following table were produced by the procedures described in the preceding examples:

| Comp. No. | X | R$_1$ | R$_2$ | R$_3$ | Melting point |
|---|---|---|---|---|---|
| 5 | Cl | -CH$_2$CH(OCH$_3$)$_2$ | CH$_3$ | cyclo-C$_3$H$_5$ | 95 - 97° |
| 6 | Cl | -CH$_2$CH(OCH$_3$)$_2$ | CH$_3$ | CH$_3$ | 125 - 127° |
| 7 | Cl | -CH$_2$CH(OCH$_3$)$_2$ | CH$_3$ | iso-C$_3$H$_7$ | 62 - 65° |
| 8 | Cl | -CH$_2$CH$_2$-S-CH$_3$ | H | CH$_3$ | 78 - 81° |
| 9 | Cl | -CH$_2$CH$_2$-S-CH$_3$ | H | H | 148 - 152° |

Continued

| Comp. No. | X | R$_1$ | R$_2$ | R$_3$ | Melting point |
|---|---|---|---|---|---|
| 10 | Cl | -CH$_2$-C(CH$_3$)$_2$-OCH$_3$ | CH$_3$ | C$_2$H$_5$ | 189 - 190° |
| 11 | Cl | -CH$_2$-C(CH$_3$)$_2$-OCH$_3$ | CH$_3$ | CH$_3$ | 158 - 160° |
| 12 | Cl | -CH$_2$-C(CH$_3$)$_2$-OCH$_3$ | CH$_3$ | Cyclo-C$_3$H$_5$ | 159 - 161° |
| 13 | Cl | -CH$_2$-C(CH$_3$)$_2$-OCH$_3$ | CH$_3$ | H | 143 - 145° |
| 14 | Cl | -C(OC$_2$H$_5$)$_2$CH$_3$ | CH$_3$ | C$_2$H$_5$ | 114 - 117° |
| 15 | Cl | -C(OC$_2$H$_5$)$_2$CH$_3$ | CH$_3$ | CH$_3$ | 120 - 122° |
| 16 | Cl | -C(OC$_2$H$_5$)$_2$CH$_3$ | CH$_3$ | H | 150 - 153° |
| 17 | Cl | -CH$_2$CH$_2$OCH$_3$ | CH$_3$ | C$_2$H$_5$ | 106 - 108 |
| 18 | Cl | -CH$_2$CH$_2$OCH$_3$ | CH$_3$ | CH$_3$ | 140 - 141° |
| 19 | Cl | -CH$_2$CH$_2$OCH$_3$ | CH$_3$ | cyclo-C$_3$H$_5$ | 78 - 82° |
| 20 | Cl | -CH$_2$CH$_2$OCH$_3$ | CH$_3$ | H | 145 - 147° |
| 21 | Cl | -CH$_2$-CH$_2$-O-CH$_2$- | | iso C$_3$H$_7$ | 189 - 190° |
| 22 | Cl | -CH$_2$-CH$_2$-O-CH$_2$- | | H | 160 - 163° |
| 23 | Cl | -CH$_2$-CH$_2$-O-CH$_2$- | | C$_2$H$_5$ | 167 - 169° |
| 24 | Cl | -CH(OCH$_3$)$_2$ | CH$_3$ | C$_2$H$_5$ | 99 - 102° |
| 25 | Cl | -CH(OCH$_3$)$_2$ | CH$_3$ | CH$_3$ | 137 - 139° |
| 26 | Cl | -CH(OCH$_3$)$_2$ | CH$_3$ | H | 155 - 157° |

Continued

| Comp. No. | X | $R_1$ | $R_2$ | $R_3$ | Melting point |
|---|---|---|---|---|---|
| 27 | Cl | $-CH(OCH_3)_2$ | $CH_3$ | cyclo-$C_3H_5$ | 101 - 105° |
| 28 | Cl | $-CH_2-O-CH_3$ | $CH_3$ | H | 188 - 189° |
| 29 | Cl | $-CH_2-O-CH_3$ | $CH_3$ | $C_2H_5$ | 125 - 127° |
| 30 | Cl | $-CH_2-O-CH_3$ | $CH_3$ | iso-$C_3H_7$ | 124 - 125° |
| 31 | $-SCH_3$ | $-\underset{CH_3}{C}(OC_2H_5)_2$ | $CH_3$ | $C_2H_5$ | 83 - 85° |
| 32 | $-SCH_3$ | $-CH_2CH_2OCH_3$ | $CH_3$ | H | 127 - 129° |
| 33 | $-SCH_3$ | $-CH(OCH_3)_2$ | $CH_3$ | $C_2H_5$ | 112 - 114° |
| 34 | $-SCH_3$ | $-CH(OCH_3)_2$ | $CH_3$ | H | 155 - 157° |
| 35 | $-SCH_3$ | $-CH_2C(CH_3)_2OCH_3$ | $CH_3$ | $C_2H_5$ | 132 - 134° |
| 36 | $-SCH_3$ | $-CH_2C(CH_3)_2OCH_3$ | $CH_3$ | H | 146 - 148° |
| 37 | $-SCH_3$ | $-CH_2-CH_2-OCH_3$ | $CH_3$ | $C_2H_5$ | 78 - 81° |
| 38 | $-SCH_3$ | $-CH_2-O-CH_3$ | $CH_3$ | $C_2H_5$ | 112 - 113° |
| 39 | $-SCH_3$ | $-CH_2-O-CH_3$ | $CH_3$ | iso-$C_3H_7$ | 109 - 111° |
| 40 | $-SCH_3$ | $-CH_2-O-CH_3$ | $CH_3$ | H | 172 - 176° |
| 41 | $-SCH_3$ | Cyclo-$C_3H_5$ | $-CH_3$ | $-CH_2-CH(OCH_3)_2$ | 100 - 102° |
| 42 | $-SCH_3$ | Cyclo-$C_3H_5$ | $-CH_3$ | $-CH_2-CH(OC_2H_5)_2$ | 115 - 116° |

The new substituted diamino-s-triazine derivatives of formula I possess excellent herbicidal properties, and are particularly suitable for the control of gramineous and broad-leaved weeds in various cultivated crops. Applied in high concentrations, the new compounds act as total herbicides; in low concentrations, on the other hand, they act as selective herbicides. Annual and perennial types of weeds which are deep-rooted and difficult to control are destroyed or damaged in growth with a high degree of success by the active substances of formula I. Application of the new active substances can be effected, with the same high level of success, before emergence (pre-emergence) and after emergence (post-emergence). Field weeds such as, e.g. millet varieties (Panicum sp.), mustard varieties (Sinapis sp.), goosefoot varieties (Chenopodiaceae), slender foxtail varieties, e.g. Amaranthus sp., grasses, e.g. Lolium sp., compositae, e.g. Taraxacum sp., and wild chamomile varieties (Matricaria sp.) are thus destroyed or inhibited in growth without damage being caused to useful plants, such as grain, maize, cotton, sorghum, and soya bean, etc.. The applied amounts vary and are dependent on the time of application; they are between 0.1 and 10 kg of active substance per hectare; in the case of application before emergence of the plants, the amount is up to 4 kg of active substance per hectare, and after emergence of the plants the amount is 1 to 5 kg of active substance per hectare. For total destruction, however, of the whole weed crop, e.g. on the fallow land adjoining the cultivated land, it is necessary to apply more than 10 kg of active substance per hectare. The operation of the normal crop rotation is not impaired in consequence of application of the new active substances.

The respective applied amounts in this test are given in the following table. Evaluation is made on the following basis:
9 = plants undamaged = control
1 = plants dead
2–8 = intermediate stages of damage

| Active substance No. | kg per hectare | Weeds | | | | | | | | | |
|---|---|---|---|---|---|---|---|---|---|---|---|
| | | Lolium multiflorum | Poa. triavalis | Alopecurus myosuorides | Digitaria sanguinalis | Setaria italica | Echinochloa crus galli | Amaranthus spez. | Chrysanthemum segetum | Sinapis alba | Ipomea purpurea |
| 1 | 0,5 | 2 | 1 | 1 | 1 | 1 | 3 | 1 | 1 | 2 | 2 |
|   | 2   | 2 | 1 | 1 | 1 | 1 | 1 | 1 | 1 | 1 | 1 |
| 5 | 0,5 | 3 | 2 | 4 | 2 | 1 | 3 | 1 | 1 | 3 | 5 |
|   | 2   | 3 | 2 | 2 | 1 | 1 | 1 | 1 | 1 | 2 | 1 |
| 6 | 2   | 2 | 1 | 3 | 2 | 1 | 3 | 1 | 1 | 1 | 1 |
| 7 | 2   | 3 | 2 | 2 | — | 1 | 3 | 1 | 2 | 2 | 2 |
| 2 | 1   | 2 | 1 | 2 | 1 | 1 | 2 | 1 | 2 | 2 | 1 |
| 42 | 4  | — | 1 | 1 | 1 | 2 | 1 | 3 | — | 2 | 1 |
|   | 2   | — | 1 | 2 | 1 | 6 | 1 | 3 | — | 2 | 2 |
| 37 | 4  | 1 | — | 1 | 1 | 1 | 1 | 1 | 1 | 1 | 1 |
|   | 2   | 1 | — | 1 | 1 | 1 | 1 | 1 | 3 | 1 | 1 |
|   | 1   | 2 | — | 2 | 2 | 2 | 1 | 1 | 4 | 5 | 1 |
| 12 | 4  | — | 1 | 1 | 2 | 2 | 1 | 2 | — | 1 | 1 |
|   | 2   | — | 1 | 1 | 2 | 2 | 1 | 3 | — | 2 | 1 |
|   | 1   | — | 1 | 2 | 3 | 3 | 1 | 3 | — | 2 | 2 |
| 14 | 4  | 2 | — | 1 | 2 | 2 | 1 | 1 | 1 | — | 2 |
|   | 2   | 2 | — | 2 | 2 | 2 | 2 | 1 | 5 | — | 5 |
| 17 | 4  | 1 | — | 1 | 1 | 2 | 1 | 1 | 1 | 1 | 1 |
|   | 2   | 2 | — | 1 | 2 | 2 | 1 | 1 | 1 | 1 | 1 |
|   | 1   | 2 | — | 1 | 3 | 4 | 2 | 1 | 1 | 3 | 1 |
| 35 | 4  | 2 | 1 | 1 | 1 | 2 | 1 | 1 | — | 1 | — |
|   | 2   | 2 | 1 | 1 | 1 | 3 | 1 | 1 | — | 3 | — |
|   | 1   | 3 | 1 | 2 | 3 | 3 | 1 | 1 | — | 4 | — |
| 19 | 4  | 1 | — | 1 | 1 | 1 | 1 | 1 | 1 | 1 | 1 |
|   | 2   | 1 | — | 1 | 1 | 2 | 1 | 1 | 1 | 1 | 1 |
|   | 1   | 1 | — | 1 | 2 | 2 | 1 | 1 | 1 | 1 | 1 |
| 15 | 4  | 1 | — | 1 | 1 | 1 | 1 | 1 | 2 | 1 | 1 |
|   | 2   | 2 | — | 2 | 2 | 2 | 2 | 2 | 3 | 1 | 1 |
|   | 1   | 2 | — | 3 | 3 | 3 | 3 | 2 | 5 | 6 | 3 |
| 24 | 4  | 1 | 1 | 1 | 1 | 1 | 1 | 1 | — | 1 | 1 |
|   | 2   | 1 | 1 | 1 | 2 | 2 | 2 | — | 1 | 1 | 1 |
|   | 1   | 3 | 1 | 1 | 3 | 2 | 4 | — | 1 | 3 | 1 |
| 27 | 4  | 1 | 1 | 1 | 1 | 1 | 1 | 2 | 1 | 2 | 1 |
|   | 2   | 1 | 1 | 1 | 1 | 1 | 1 | 2 | 1 | 2 | 1 |
|   | 1   | 2 | 1 | 1 | 3 | 1 | 3 | 4 | 1 | 6 | 1 |
| 23 | 4  | 1 | — | 1 | 1 | 1 | 1 | 2 | 2 | 1 | 1 |
|   | 2   | 1 | — | 1 | 1 | 1 | 1 | 2 | 2 | 1 | 1 |
|   | 1   | 1 | — | 1 | 2 | 1 | 1 | 2 | 2 | 2 | 1 |

1. HERBICIDAL ACTION WITH APPLICATION OF THE ACTIVE SUBSTANCES BEFORE EMERGENCE OF THE PLANTS (PRE-EMERGENCE APPLICATION)

a) Directly after sowing of the test plants, the seed trays are maintained at 22° to 25° with 50 to 70 percent relative humidity. Evaluation of the test results is made after 28 days.
The following test plants are used:

Cultivated plants:   cotton
                     maize
                     sorghum
Weeds                Lolium multiflorum
                     Poa trivialis
                     Alopercurus myosuorides
                     Digitaria sanguinalis
                     Setaria italica
                     Echinochloa crus galli
                     Amaranthus spez.
                     Chysanthemum segetum
                     Sinapis alba
                     Ipomea purpurea

| Active substance No. | kg per hectare | Cultivated Plants | | | | |
|---|---|---|---|---|---|---|
| | | Maize | Rice | Sorghum | Soya | Cotton |
| 1 | 0,5 | 9 | — | 8 | — | 7 |
|   | 2   | 9 | — | 8 | — | 7 |
| 5 | 0,5 | 9 | — | 9 | — | 9 |
|   | 2   | 8 | — | 9 | — | 7 |
| 6 | 2   | 9 | — | 7 | — | 9 |
| 7 | 2   | 9 | — | 9 | — | 9 |
| 2 | 1   | — | — | — | — | 9 |
| 42 | 4  | 8 | 9 | 6 | — | 9 |
|   | 2   | 9 | 9 | 9 | — | 9 |
| 37 | 4  | 3 | — | — | — | 8 |
|   | 2   | 6 | — | — | — | 9 |
|   | 1   | 7 | — | — | — | 9 |
| 12 | 4  | 9 | — | 7 | — | 7 |
|   | 2   | 9 | — | 8 | — | 8 |
|   | 1   | 9 | — | 8 | — | 8 |
| 14 | 4  | 8 | — | 7 | 9 | 9 |
|   | 2   | 9 | — | 8 | 9 | 9 |
| 17 | 4  | 7 | — | — | — | 8 |
|   | 2   | 7 | — | — | — | 8 |
|   | 1   | 8 | — | — | — | 9 |
| 35 | 4  | 8 | — | 9 | 8 | 9 |
|   | 2   | 8 | — | 9 | 9 | 9 |
|   | 1   | 9 | — | 9 | 9 | 9 |
| 19 | 4  | 6 | — | — | — | — |
|   | 2   | 9 | — | — | — | 7 |
|   | 1   | 9 | — | — | — | 9 |
| 15 | 4  | 9 | — | — | 8 | — |
|   | 2   | 9 | — | — | 8 | — |
|   | 1   | 9 | — | — | 9 | — |

Continued

| Active substance No. | kg per hectare | aize | Rice | Sorghum | Soya | Cotton |
|---|---|---|---|---|---|---|
| 24 | 4 | 8 | — | — | — | — |
|  | 2 | 8 | — | — | — | — |
|  | 1 | 9 | — | — | — | — |
| 27 | 4 | 7 | — | — | — | — |
|  | 2 | 8 | — | 6 | — | 7 |
|  | 1 | 9 | — | 8 | — | 8 |
| 23 | 4 | 6 | — | 5 | — | 7 |
|  | 2 | 8 | — | 7 | 5 | 8 |
|  | 1 | 8 | — | 8 | 8 | 9 |

HERBICIDAL ACTION WITH APPLICATION OF THE ACTIVE SUBSTANCES AFTER EMERGENCE OF THE PLANTS (POST-EMERGENCE APPLICATION)

Sinapis alba, Matricaria chamomilla, Alopecurus myosuroides, Lolium multiflorum, Setaria italica, Papaver rhoeas, and the cultivated plants: oats, wheat, maize, soya bean, sorghum and cotton, are sprayed in the 4- to 6-leaf stage with an aqueous active substance emulsion (obtained from a 25 percent emulsifiable concentrate). The plants are then maintained at 24° to 26° with 45 to 60 percent relative humidity. The test results are evaluated 14 days after the treatment. Assessment is made on the basis of the following scale of values:
9 = plants undamaged (control)
1 = plants dead
8-2 = intermediate stages of damage

COMPOSITION OF THE EMULSIFIABLE CONCENTRATE 25 parts of active substance, 32.5 parts of methyl ethyl ketone, 32.5 parts of 3,5,5-trimethyl-2-cyclohexen-1-one and 10 parts of a mixture of nonylphenolpolyoxyethylene and calcium dodecylbenzene sulphonate.

Herbicidal agents according to the invention are produced in a manner known per se by the intimate mixing and grinding of active substances of the general formula I with suitable carriers, optionally with the addition of dispersing agents or solvents which are inert to the active substances. The active substances can be obtained and used in the following forms:
  solid preparations: dusts, scattering agents, granulates, (coated granulates, impregnated granulates and homogeneous granulates);
  water-dispersible concentrates of the active substance: wettable powders, pastes, emulsions;
  liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 mm to 0.2 mm; and for granulates 0.2 mm or coarser.

The concentrations of active substance in the solid preparation forms are from 0.5 to 80 percent.

To these mixtures may also be added additives stabilising the active substance, and/or non-ionic, anion-active, and cation-active substances, which, for exam-

| Active substance No. | kg/hectare | Sinapis alba | Weeds after 15 days Matricaria chamomilla | Alopecurus myosuroides | Lolium multifl. | Setaria italica | Papaver rhoeas |
|---|---|---|---|---|---|---|---|
| 1 | 1 | 1 | 1 | 1 | 3 | 2 | 1 |
| 5 | 1 | 1 | 1 | 1 | 2 | 2 | 2 |
|  | 0,5 | 1 | 1 | 3 | — | 3 | 3 |
| 6 | 0,5 | 1 | 1 | — | — | 1 | — |
| 7 | 1 | 1 | 2 | — | — | — | — |
| 2 | 1 | 1 | 2 | 1 | — | — | — |
| 17 | 2 | 1 | 1 | 3 | 3 | 1 | 1 |
| 35 | 2 | 1 | 2 | 3 | — | — | 1 |
| 27 | 2 | 3 | 1 | 1 | 1 | 2 | — |
| 23 | 2 | 1 | 1 | 2 | 3 | 2 | — |

Cultivated Plants after 15 days

| Active substance No. | kg/hectare | Oats | Wheat | Maize | Soya | Sorghum | Cotton |
|---|---|---|---|---|---|---|---|
| 1 | 1 | 8 | 8 | 9 | 8 | 9 | 9 |
| 5 | 1 | 7 | 8 | 8 | — | 9 | — |
| 6 | 1 | 8 | 8 | 8 | 9 | 9 | 9 |
| 7 | 1 | 9 | 9 | 9 | 9 | 9 | 9 |
| 2 | 1 | 8 | 8 | 8 | 9 | 9 | 9 |
| 17 | 2 | 7 | 8 | 8 | — | 9 | — |
| 35 | 2 | 8 | 8 | 8 | 8 | 9 | 8 |
| 27 | 2 | — | — | 8 | 8 | 8 | — |
| 23 | 2 | — | — | 7 | 8 | 8 | — | ple, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, its alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e., wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80 percent.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali metal and alkaline-earth metal salts.

Suitable anti-foam agents are, for example, silicones.

The active substances are so mixed, ground, sieved and strained with the above-mentioned additives that the solid constituent in the case of wettable powders has a particles size not exceeding 0.02 to 0.04 mm, and in the case of pastes not exceeding 0.03 mm. Dispersing agents such as those mentioned in the preceding paragraphs, organic solvents and water are used in the preparation of emulsion concentrates and pastes. Suitable solvents are, e.g. the following: alcohols, benzene, xylenes, toluene, dimethylsulphoxide, and mineral oil fractions boiling in the range of 120° to 350°. The solvents must be practically odourless, non-phytotoxic, inert to the active substances, and not readily inflammable.

Furthermore, the agents according to the invention can be used in the form of solutions. For this purpose the active substance (or several active substances) of the general formula I is (or are) dissolved in suitable organic solvents, in mixtures of solvents or in water. As organic solvents it is possible to use aliphatic and aromatic hydrocarbons, their chlorinated derivatives, alkylnaphthalenes, mineral oils on their own or in admixture with each other. The solutions should contain the active substance in a concentration of from 1 to 20 percent.

Other biocidal active substances may be added to the described agents according to the invention. For the widening of their sphere of action, the new agents may also contain, in addition to the stated compounds of the general formula I, e.g. insecticides, fungicides, bactericides, fungistatics, bacteriostatics or nematocides. The agents according to the invention can also contain fertilisers, trace elements, etc..

Preparations of the new active substances of the generall formula I are described in the following. The term 'parts' denotes parts by weight.

GRANULATE

The following substances are used for the preparation of a 5 percent granulate:
 5 parts of 2-chloro-4-ethylamino-6-(1'-cyano-1'-methyl-3',3'-dimethoxy-propylamino)-s-triazine,
 0.25 parts of epichlorohydrin,
 0.25 parts of cetyl polyglycol ether,
 3.50 parts of polyethylene glycol,
 91 parts of kaolin (particle size 0.3 to 0.8 mm).

The active substances is mixed with epichlorohydrin, and the mixture dissolved in 6 parts of acetone; polyethylene glycol and cetyl polyglycol ether are then added. The thus obtained solution is sprayed on to kaolin, and subsequently evaporated off in vacuo.

WETTABLE POWDER

The following constituents are used for the preparation of a) a 50 percent, b) a 25 percent, and c) a 10 percent wettable powder:

a)
 50 parts of 2-methylthio-4-ethylamino-6-(1'-cyano-1'-methyl-3'-methoxy-n-propylamino)-s-triazine,
 5 parts of sodium dibutylnaphthyl sulphonate,
 3 parts of naphthalenesulphonic acid/phenolsulphonic acid/formaldehyde condensate 3:2:1,
 20 parts of kaolin,
 22 parts of Champagne chalk;

b)
 25 parts of 2-chloro-4-(1'-cyano-1'-methyl-2'-methoxy-ethylamino)-6-ethylamino-s-triazine,
 5 parts of the sodium salt of oleylmethyl tauride,
 2.5 parts of naphthalenesulphonic acid/formaldehyde condensate,
 0.5 part of carboxymethyl cellulose,
 5 parts of neutral potassium aluminium silicate,
 62 parts of kaolin;

c)
 10 parts of 2-chloro-4-(1'-cyano-1'-methyl-2'-methoxy-ethylamino)-6-isopropylamino-s-triazine,
 3 parts of a mixture of the sodium salts of saturated fatty alcohol sulphates,
 5 parts of nahpthalenesulphonic acid/formaldehyde condensate,
 82 parts of kaolin.

The given active substance is absorbed on to the appropriate carrier (kaolin and chalk), and the whole subsequently mixed and ground. Wettable powders having excellent wettability and suspension properties are thus obtained. Suspensions of any desired concentration of active substance can be prepared from the said wettable powders by dilution with water. Such suspensions are employed for the control of weeds and wild grasses in cultivated crops.

PASTE

The following substances are used for the preparation of a 45 percent paste:
 45 parts of 2-methylthio-4-(1'-cyano-1'-cyclopropyl-ethylamino)-6(2'',2'''-diethoxy-ethylamino)-s-triazine (=compound 42),
 5 parts of sodium aluminum silicate,
 14 parts of cetyl polyglycol ether having 8 moles of ethylene oxide,
 1 part of oleyl polyglycol ether having 5 moles of ethylene oxide,
 2 parts of spindle oil,
 10 parts of polyethylene glycol,
 23 parts of water.

The active substance is imtimately mixed and ground, in suitable devices, with the additives. A paste is thus obtained from which can be prepared, by dilution with water, suspensions of any desired concentration.

EMULSION CONCENTRATE

The following constituents are mixed together for the preparation of a 25 percent emulsion concentrate:
 25 parts of 2-methylthio-4-(1'-methyl-1'-cyano-2'-methoxy-ethylamino)-6-ethylamino-s-triazine,
 5 parts of a mixture of nonylphenolpolyoxyethylene and calcium dodecylbenzene sulphonate ("Emullat P 140 HFP"),
 35 parts of isophorone (3,5,5-trimethyl-2-cyclohexen-1-one),
 35 parts of dimethylformamide.

This concentrate can be diluted with water to obtain emulsions of suitable concentrations. Such emulsions are suitable for the control of weeds in cultivated crops, such as, e.g. cotton, maize, etc..

We claim:
1. 2-chloro-4-(1'-cyano-1'-methyl-2'-methoxy-ethylamino)-6-ethylamino-s-triazine.
2. 2-methylthio-4-(1'-cyano-1'-methyl-2'-methoxy-ethylamino)-6-ethylamino-s-triazine.
3. 2-methylthio-4-(1'-cyano-1'-methyl-3'-methoxy-n-propylamino)-6-ethylamino-s-triazine.
4. 2-methylthio-4-(1'-cyano-1'-methyl-3',3',-dimethoxy-n-propylamino)-s-triazine.

* * * * *